United States Patent
Hauge et al.

(10) Patent No.: US 7,462,290 B2
(45) Date of Patent: Dec. 9, 2008

(54) DEVICE AND A METHOD FOR REMOVING SOLIDS

(75) Inventors: Espen Hauge, Oslo (NO); Deborah Wood, Oslo (NO)

(73) Assignee: Vetco Gray Scandinavia AS, Billingstad (NO)

( * ) Notice: Subject to any disclaimer, the term of this patent is extended or adjusted under 35 U.S.C. 154(b) by 36 days.

(21) Appl. No.: 10/786,591

(22) Filed: Feb. 26, 2004

(65) Prior Publication Data
US 2004/0222170 A1 Nov. 11, 2004

(30) Foreign Application Priority Data
Feb. 27, 2003 (NO) .................................. 20030934

(51) Int. Cl.
*B01D 21/24* (2006.01)
(52) U.S. Cl. .................. 210/803; 210/220; 210/513; 210/523; 210/532.1
(58) Field of Classification Search .................. 210/803
See application file for complete search history.

(56) References Cited

U.S. PATENT DOCUMENTS

| | | | | |
|---|---|---|---|---|
| 1,694,668 A | * | 12/1928 | Peters ...................... 210/172.2 |
| 1,793,510 A | * | 2/1931 | Raymond .................... 210/519 |
| 2,732,944 A | * | 1/1956 | Hays .......................... 210/220 |
| 2,780,360 A | * | 2/1957 | Bon et al. ...................... 95/241 |
| 2,891,008 A | * | 6/1959 | Weston et al. ................ 210/208 |
| 2,980,934 A | * | 4/1961 | Steindorf ...................... 15/1.7 |
| 3,152,071 A | * | 10/1964 | Kraft .......................... 210/738 |
| 3,364,664 A | * | 1/1968 | Doane .......................... 55/394 |
| 3,846,293 A | * | 11/1974 | Campbell ..................... 210/631 |
| 4,043,912 A | | 8/1977 | Bascope et al. |
| 4,276,165 A | * | 6/1981 | Chamberlain ............. 210/242.1 |
| 4,293,416 A | * | 10/1981 | Keoteklian .................. 210/208 |
| 4,376,048 A | * | 3/1983 | Kovacs ..................... 210/221.1 |
| 4,999,115 A | * | 3/1991 | Peterson ..................... 210/728 |
| 5,047,150 A | * | 9/1991 | Mitchell ..................... 210/525 |
| 5,108,586 A | * | 4/1992 | Iwashige et al. ............ 209/170 |
| 5,176,838 A | * | 1/1993 | Chin et al. .................. 210/800 |
| 5,772,885 A | * | 6/1998 | Sarrouh ...................... 210/523 |
| 5,914,049 A | * | 6/1999 | Brauch et al. ............... 210/803 |
| 6,045,709 A | * | 4/2000 | Roberts ...................... 210/803 |
| 6,073,779 A | * | 6/2000 | Shea et al. .................. 210/527 |

(Continued)

FOREIGN PATENT DOCUMENTS

NO 305347 B1 5/1999

(Continued)

*Primary Examiner*—Robert James Popovics
(74) *Attorney, Agent, or Firm*—Venable LLP; Eric J. Franklin

(57) ABSTRACT

A device for removing solids from a fluid containment space. A hood is arranged or intended to be arranged at a bottom surface of the fluid containment space. At least one inlet opening and at least one outlet opening are provided on a first side of the hood. The hood is provided with one or more elements for directing fluids through the respective outlet opening on the first side of the hood from the inner space of the hood to the fluid containment space exterior of the hood in an essentially horizontal direction or in a direction towards the bottom surface of the fluid containment space. Also provided are a separator including such a device and a method for removing solids from a fluid containment space.

13 Claims, 3 Drawing Sheets

U.S. PATENT DOCUMENTS

| | | | | |
|---|---|---|---|---|
| 6,142,160 A * | 11/2000 | Winslow et al. | ............ | 134/22.1 |
| 6,197,190 B1 * | 3/2001 | Hanlon | ....................... | 210/197 |
| 6,234,323 B1 * | 5/2001 | Sarrouh | ...................... | 210/523 |
| 6,238,572 B1 * | 5/2001 | Batten | ........................ | 210/739 |
| 6,371,308 B1 * | 4/2002 | Zhou | .......................... | 210/519 |
| 6,797,186 B2 * | 9/2004 | Hubenthal et al. | .......... | 210/803 |
| 6,878,295 B2 * | 4/2005 | Hubenthal et al. | .......... | 210/803 |
| 6,953,528 B2 * | 10/2005 | Nesfield | .................... | 210/747 |
| 7,284,670 B2 * | 10/2007 | Schmid | ...................... | 210/523 |
| 2003/0189016 A1 * | 10/2003 | Tucker | ....................... | 210/803 |
| 2004/0000526 A1 * | 1/2004 | Hubenthal et al. | .......... | 210/803 |
| 2004/0222170 A1 * | 11/2004 | Hauge et al. | ................ | 210/803 |
| 2005/0006321 A1 * | 1/2005 | Hubenthal et al. | .......... | 210/803 |

FOREIGN PATENT DOCUMENTS

WO    WO 99/31347 A1    6/1999

* cited by examiner

DEVICE AND A METHOD FOR REMOVING SOLIDS

CROSS-REFERENCE TO RELATED APPLICATIONS

This application claims priority to Norwegian patent application 20030934 filed Feb. 27, 2003.

FIELD OF THE INVENTION AND PRIOR ART

The present invention relates to a device for removing solids from a fluid containment space, a separator including such a device and a method for removing solids from a fluid containment space.

The present invention is particularly applicable for solids removal from separator vessels utilized in the production of crude oil, especially in processes where crude oil must be separated from produced water and wherein a liquid mixture of oil and water entering the vessel contains solids in the form of sand and other sediments.

The invention may be particularly useful for subsea oil industry applications, where out of specification operation may not normally be compensated by downstream process steps, and intervention with a shovel or the like is not an option.

However, the invention may also be applicable in many other types of processes in which solids are present in fluid streams, such as waste water treatment and fermentation processes.

Most crude oils (and/or produced water) contain sand and other types of solids. A part of these solids will accumulate at the bottom of separator vessels, storage tanks and other fluid containment spaces. Accumulation of solids in such vessels and tanks may require shutdown of the equipment in order to clean out the accumulated solids. Devices for removing accumulated solids from fluid containment spaces are previously known.

These devices typically comprise a hood, e.g. in the form of an inverted pan or tray, located at the bottom surface of the fluid containment space. Inlet openings are provided in the sides of the hood so as to allow fluid communication into the inner space of the hood from along the bottom surface of the fluid containment space. Drain means are provided for removing fluidised solids from the inner space of the hood and flushing means are provided for directing flushing fluid towards the inlet openings of the hood. The flushing means are arranged to jet flushing fluid along the bottom surface of the fluid containment space to fluidize accumulated solids. The fluidized solids are then withdrawn from the inner space of the hood by the above-mentioned drain means. One such device is e.g. disclosed in the patent document U.S. Pat. No. 5,176,838 A.

A problem associated with this known type of device is schematically illustrated in FIG. 1. The flushing means 1 will, as indicated above, cause a fluid flow along the bottom surface 2 of the fluid containment space 3. A part of this fluid flow will pass through the inlet openings 4 of the hood 5 and enter the inner space 6 of the hood as desired. However another part of the fluid flow will hit the outer surface 7 of the hood and will thereby be directed upwards in the fluid containment space 3. This will affect the fluids accommodated in the upper part of the fluid containment space and e.g. disrupt a separation process taking place in the fluid containment space. Thus, the normal operation of the appliance equipped with the device usually starts producing out of specification products or even has to be interrupted during the effectuation of a flushing sequence by the flushing means. This will cause delays to the processing in question, which in its turn will result in lost or delayed production or increased processing costs. Furthermore, there is a risk that the time intervals between the flushing sequences will be so long that large quantities of solids that might plug the device in question will be accumulated in the fluid containment space.

SUMMARY OF THE INVENTION

The object of the present invention is to provide a device and a method for removing solids from a fluid containment space, by means of which it will be possible to eliminate or at least reduce the above-mentioned problem.

According to the invention, at least one inlet opening and at least one outlet opening is provided on the same side of the hood, the outlet opening or openings being provided on a level above the inlet opening or openings, and the hood being provided with means for directing fluids through the outlet opening or openings on said first side of the hood from the inner space of the hood to the fluid containment space exterior of the hood in an essentially horizontal direction or in a direction towards the bottom surface of the fluid containment space. Since a part of the fluids entering the inner space of the hood will be recirculated to the fluid containment space exterior of the hood, a larger inflow into the inner space of the hood is allowed as compared to a correspondingly dimensioned device having a corresponding drain capacity but no outlet openings in the hood. This implies that the hood of the inventive device can be designed with larger inlet openings as compared to such a correspondingly dimensioned device. The larger the inlet openings, the smaller quantity of fluids will in connection with a flushing sequence hit the outer surface of the hood and be directed upwards in the fluid containment space. The outflow from the inner space of the hood is essentially horizontally directed or directed towards the bottom surface of the fluid containment space, and this outflow will therefore not affect the fluids accommodated in the upper part of the fluid containment space to any appreciable extent. The outflow through the outlet opening or openings in the hood will however affect any vertically directed fluid flow caused by fluids hitting the outer surface of the hood in connection with a flushing sequence so as to deflect this vertically directed fluid flow. Consequently, this outflow will contribute in preventing the fluid flows generated in connection with a flushing sequence from negatively affecting the fluids accommodated in the upper part of the fluid containment space. The solids to be removed are also kept close to the bottom of the fluid containment space, and not spread out to a larger part or the entire volume of said space. With the device according to the invention there will be given possibilities to perform a flushing sequence without having to interrupt the normal operation of the appliance equipped with the device, since the fluid circulation caused by the flushing means can be concentrated to the lower part of the fluid containment space.

According to a preferred embodiment of the invention, the directing means is arranged to direct fluids through the respective outlet opening on said first side of the hood from the inner space of the hood to the fluid containment space exterior of the hood in a direction essentially opposite the flushing direction of the flushing means arranged on the first side of the hood. This will create improved possibilities for a circulation of fluids between the fluid containment space exterior of the hood and the inner space of the hood concentrated to the lower part of the fluid containment space in connection with a flushing sequence. This fluid circulation will, at least essentially, keep the fluid flows caused by the flushing means concentrated to the vicinity of the hood in the lower part of the fluid containment space. Thus, the present invention accomplishes an efficient solids removal without creating upset conditions of the separation process in the fluid containment space.

According to a further preferred embodiment of the invention, at least one inlet opening is provided on a second side of the hood opposite the first side thereof for allowing fluid communication from the fluid containment space exterior of the hood to the inner space of the hood, flushing means being provided for directing flushing fluid via the fluid containment space exterior of the hood towards said at least one inlet opening on the second side of the hood and at least one outlet opening being provided on said second side of the hood on a level above the respective inlet opening for allowing fluid communication from the inner space of the hood to the fluid containment space exterior of the hood, the hood being provided with means for directing fluids through the respective outlet opening on said second side of the hood from the inner space of the hood to the fluid containment space exterior of the hood in an essentially horizontal direction or in a direction towards the bottom surface of the fluid containment space. By this symmetrical structure of the device, a larger area of the bottom surface can be reached by the flushing fluids.

Further advantages as well as advantageous features of the inventive device will appear from the following description and the dependent claims.

The invention also relates to a separator including a separator vessel provided with an inventive device at the bottom surface.

The invention also relates to a method for removing solids from a fluid containment space.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
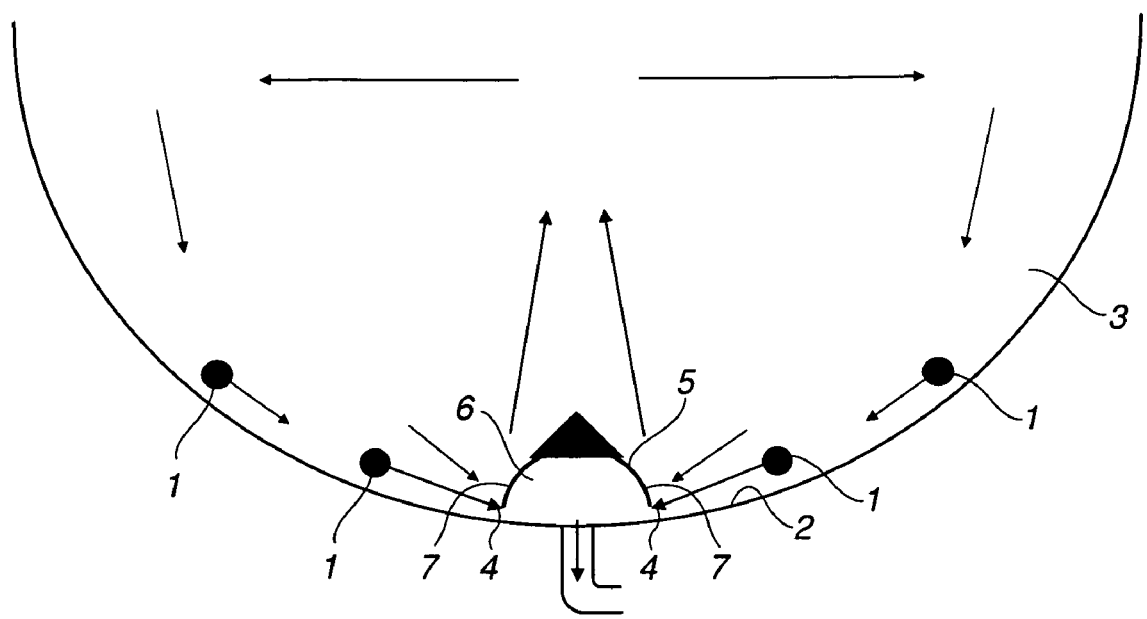
FIG. 1 is a schematical cross-sectional view illustrating a device of previously known design for removing solids from a fluid containment space.
Figure 2:
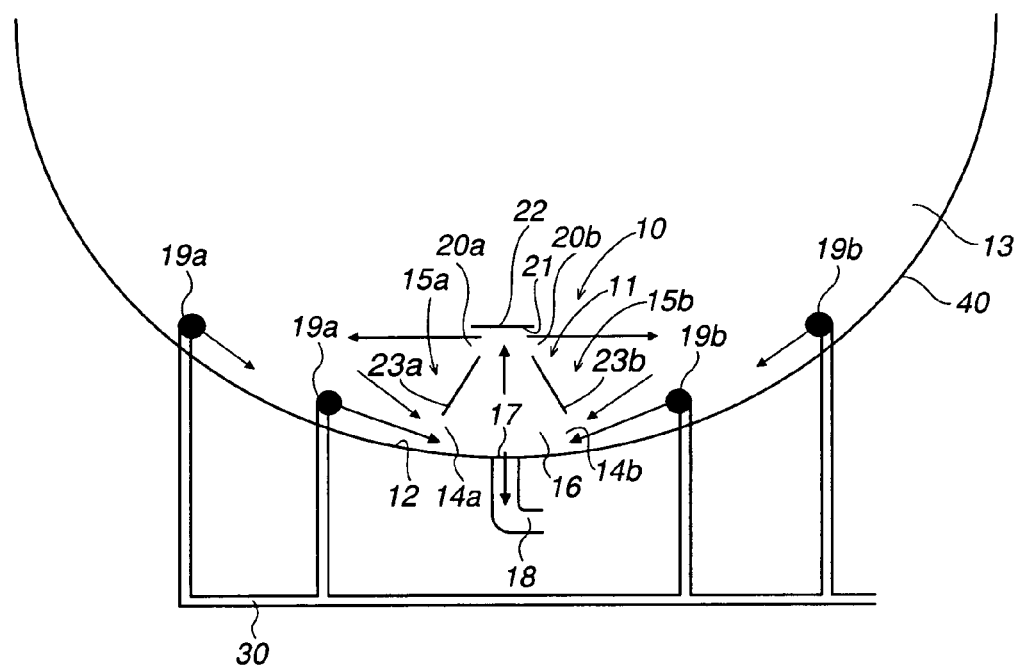
FIG. 2 is a schematical cross-sectional view of a device according to the invention for removing solids from a fluid containment space.
Figure 3:
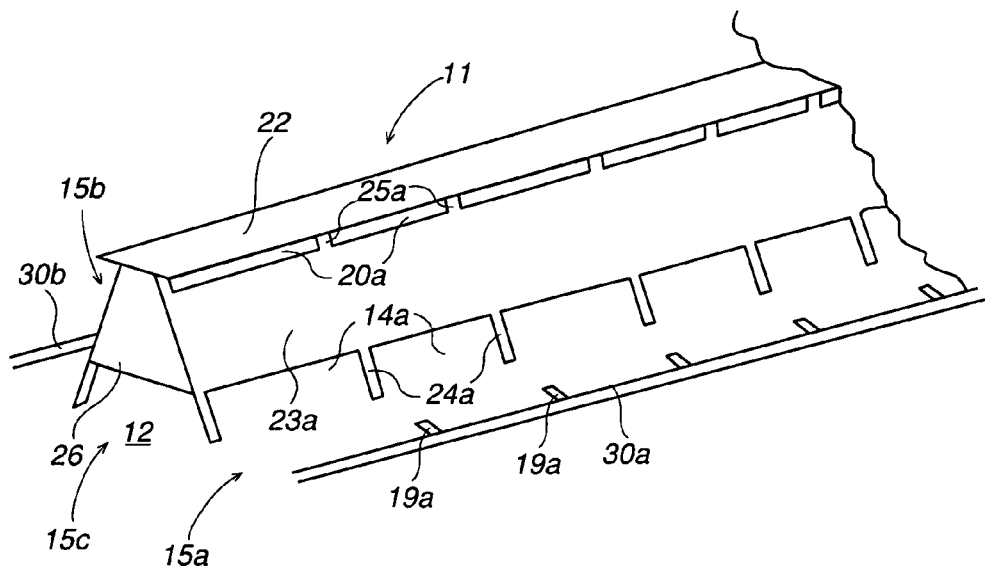
FIG. 3 is a schematical perspective view of a part of the device according to FIG. 2.
Figure 4:
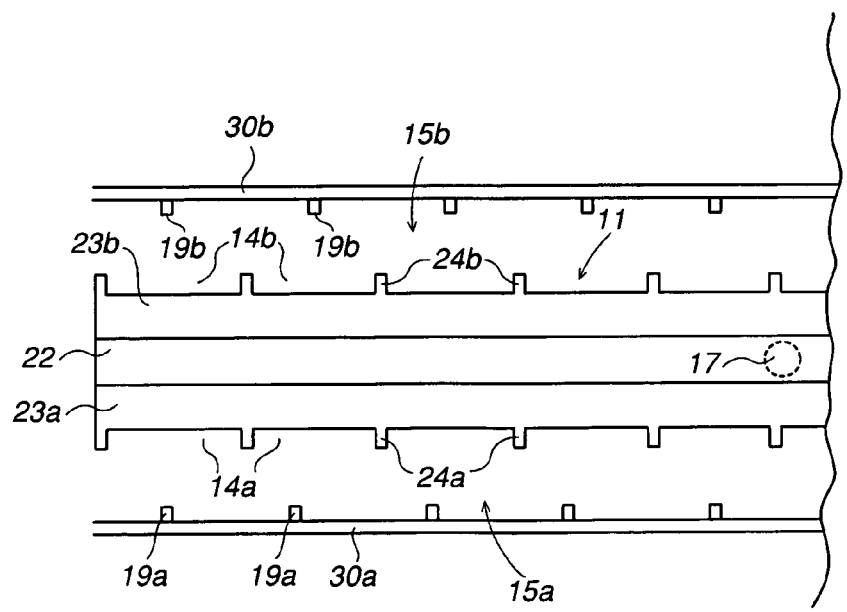
FIG. 4 is a schematical view from above of the part illustrated in FIG. 3.

A device 10 according to the present invention is illustrated in FIGS. 2-4. This device comprises a hood 11 arranged or intended to be arranged at a bottom surface 12 of a fluid containment space 13, e.g. in a separator vessel or a tank 40 in which crude oil are to be separated from produced water, and wherein a liquid mixture of oil and water entering the vessel contains solids. One or several inlet openings 14a are provided on a first side 15a of the hood for allowing fluid communication from the fluid containment space 13 exterior of the hood 11 to an inner space 16 of the hood. In the illustrated embodiment, the hood 11 is symmetrically designed. Consequently, one or several inlet openings 14b are also provided on a second side 15b of the hood opposite the first side 15a thereof for allowing fluid communication from the fluid containment space exterior of the hood to the inner space of the hood.

The device further comprises drain means for removing fluidised solids from the inner space 16 of the hood and flushing means for directing flushing fluid via the fluid containment space exterior of the hood 11 towards the respective inlet opening 14a, 14b.

The drain means comprise a drain opening 17 which opens into the inner space 16 of the hood. The drain opening 17 is preferably centrally located underneath the hood 11 in the bottom surface 12 of the fluid containment space and is connected to a drain piping 18. Through this drain opening 17 and drain piping 18, fluidised solids are withdrawn from the fluid containment space 13 via the inner space 16 of the hood due to the effect of a pressure drop established in a suitable manner.

The flushing means comprise jet nozzles 19a, 19b arranged on the respective side 15a, 15b of the hood for directing flushing fluid towards the inlet openings 14a, 14b of the hood. The nozzles 19a, 19b are arranged to jet flushing fluid along the bottom surface 12 of the fluid containment space to fluidize solids accumulated on the bottom surface 12 and direct the fluidized solids into the inner space 16 of the hood through the respective inlet opening 14a, 14b. Thus, the solids having entered the inner space 16 are fluidised and remain fluidised by the action of the jet flushing. The nozzles are connected to a supply of flushing fluid via a supply line 30.

One or several outlet openings 20a, 20b are provided on the respective side 15a, 15b of the hood on a level above the respective inlet opening 14a, 14b for allowing fluid communication from the inner space 16 of the hood to the fluid containment space 13 exterior of the hood. The hood 11 is provided with means 21 for directing fluids through the respective outlet opening 20a, 20b from the inner space 16 of the hood to the fluid containment space 13 exterior of the hood in an essentially horizontal direction or in a direction towards the bottom surface 12 of the fluid containment space. In the illustrated embodiment, the directing means is constituted by a lower surface 21 of a top part 22 of the hood. The directing means 21 is preferably arranged to direct the outflow from the respective outlet opening 20a, 20b in a direction essentially opposite the flushing direction of the nozzles 19a, 19b arranged on the corresponding side 15a, 15b of the hood. It may be advantageous to direct the outflow from the openings 20a, 20b towards the vessel wall in front of the jet nozzles.

As illustrated by the arrows in FIG. 2, a circulation of fluids between the fluid containment space 13 exterior of the hood and the inner space 16 of the hood will be established via the inlet openings 14a, 14b and the outlet openings 20a, 20b on the respective side 15a, 15b of the hood in connection with a flushing sequence, i.e. when flushing fluid is jetted from the nozzles 19a, 19b. The device 10 is so designed that it will be possible to concentrate this fluid circulation to the lower part of the fluid containment space 13.

The illustrated hood 11 is an elongated structure having an inverted V-shape as seen in cross-section. The legs of the inverted V-shape are formed by two opposite side walls 23a, 23b, which are inclined towards each other as seen in the direction upwards. The apex of the inverted V-shape is formed by the top part 22 of the hood. The outlet openings 20a, 20b are here provided between the respective side wall 23a, 23b and the top part 22 and the inlet openings 14a, 14b between the respective side wall 23a, 23b and the bottom surface 12 of the fluid containment space. The shape and inclination of the side walls 23a, 23b as well as the top part 22 of the hood are made in order to avoid the accumulation of solids on top of their outer surfaces. The top part may preferably for this purpose have a triangular shape, such as a triangular lid. The hood 11 as a whole may also have any other suitable shape to minimise the potential for solids to settle on top of it, which will be apparent for a person with ordinary skill in the art.

In the embodiment illustrated in FIGS. 3 and 4, the longitudinal side walls 23a, 23b of the hood are supported on the bottom surface 12 by bar-shaped supporting members 24a, 24b projecting from the lower edge of the respective side wall 23a, 23b. The hood 11 is here provided with several inlet openings 14a, 14b on its longitudinal sides 15a, 15b. The inlet openings 14a, 14b are arranged in a row along the respective side 15a, 15b mutually separated by the supporting members 24a, 24b. The supporting members 24a, 24b and the respective side wall 23a, 23b may be formed all in one piece or constitute separate elements.

The top part 22 of the hood 11 is connected to the longitudinal side walls 23a, 23b by bar-shaped connecting members 25a (only shown for side 15a in FIG. 3) projecting from the upper edge of the respective side wall 23a, 23b. The hood 11 is here provided with several outlet openings 20a, 20b on its longitudinal sides 15a, 15b. The outlet openings 20a, 20b are arranged in a row along the respective side 15a, 15b mutually separated by the connecting members 25a. The connecting members 25a and the respective side wall 23a, 23b may be formed all in one piece or constitute separate elements.

In the embodiment illustrated in FIGS. 2-4, the top part 22 of the hood and its lower surface 21 extend in a horizontal direction beyond the outlet openings 20a, 20b. Furthermore, the respective short side 15c of the hood is provided with an inlet opening between the side wall 26 of the short side and the bottom surface 12, but no outlet opening is provided on the shorts sides. If so desired, the respective short side 15c could be designed without any opening, in which case the side wall 26 would cover the entire area of the short side.

In the embodiment illustrated in FIGS. 3 and 4, one nozzle 19a, 19b is arranged in front of each inlet opening 14a, 14b. The respective nozzle 19a, 19b points towards the associated inlet opening 14a, 14b so as to be able to direct flushing fluid towards the inlet opening 14a, 14b in connection with a flushing sequence. The nozzles 19a, 19b on the respective side 15a, 15b of the hood are here arranged in a row and connected to each other by a pipe 30a, 30b arranged to supply flushing fluid to the nozzles. If so desired, two or more rows of nozzles 19a, 19b may be provided behind each other on the respective side 15a, 15b. Nozzles belonging to two such rows are illustrated in FIG. 2 on the respective side 15a, 15b of the hood.

When solids are to be removed from the bottom surface 12 of the fluid containment space, the drain means are activated so as to allow a withdrawal of fluids through the drain opening 17, e.g. by opening a valve arranged in the drain piping 18, and a flushing sequence is initiated. During the flushing sequence, the nozzles 19a, 19b jet flushing fluid along the bottom surface 12 towards the inlet openings 14a, 14b. The flushing fluid will fluidize solids settled on the bottom surface and force the fluidized solids together with flushing fluid and other nearby fluids from the fluid containment space 13 exterior of the hood 11 into the inner space 16 of the hood via the inlet openings 14a, 14b on the respective side 15a, 15b of the hood. A part of the fluids entering the inner space 16 of the hood is together with fluidised solids withdrawn by the drain means via the drain opening 17, and another part of said fluids is made to flow from the inner space 16 of the hood back to the fluid containment space 13 exterior of the hood in an essentially horizontal direction or in a direction towards the bottom surface 12 of the fluid containment space through the outlet openings 20a, 20b.

During a first mild flushing mode the nozzles 19a, 19b are made to jet flushing fluid at such a rate than the circulation of fluids between the fluid containment space 13 exterior of the hood and the inner space 16 of the hood via the inlet openings 14a, 14b and the outlet openings 20a, 20b will essentially only affect the fluids in the lower part of the fluid containment space and leave the fluids in the upper part of the fluid containment space essentially unaffected by the circulation. This mild flushing may be performed continuously or intermittently with suitable intervals without having to shut down the appliance associated with the fluid containment space.

During a second heavy flushing mode the nozzles 19a, 19b are made to jet flushing fluid at a higher rate than during the mild flushing mode. The heavy flushing mode is intended to be used when a more powerful flushing is required for removing the solids, e.g. when larger amounts of solids or more compact solids have been settled on the bottom surface of the fluid containment space. In the heavy flushing mode, the appliance associated with the fluid containment space is intended to be shut down. The heavy flushing mode is only expected to be used after a period of unavailability of the continuous or intermittent flushing, caused by operational problems or erroneous operation.

The device 10 according to the invention is suitable for use in a separator vessel, such as a gravity separator, for removing solids settled on the bottom of the vessel. In FIG. 2, the device 10 is illustrated located on the bottom surface 12 of a separator vessel 40 having a cylindrical cross-section (only the lower part of the separator vessel 40 is shown in FIG. 2). The device according to the invention is of course not limited to this use. On the contrary, it may be used in any type of fluid containment space where solids are accumulated on a bottom surface. The inventive device may also be located in a vessel having another geometrical cross-section or shape, such as a squared cross-section depending on the specific industrial application.

The invention is of course not in any way restricted to the preferred embodiments described above. On the contrary, many possibilities to modifications thereof will be apparent to a person with ordinary skill in the art without departing from the basic idea of the invention such as defined in the appended claims.

The inventive device does not for example necessarily have to be symmetrically designed, such as in the exemplary embodiment shown in the figures. The hood including the side walls and the top part may for instance have other designs than shown in FIGS. 2-4.

The invention claimed is:

1. A device for removing solids from a fluid containment space within a separator vessel for separating liquids, said device comprising:

a hood arranged at a bottom surface of the fluid containment space, the hood comprising at least one inlet opening provided on a first side of the hood for allowing fluid communication from the fluid containment space exterior of the hood to an inner space of the hood, the hood further comprising at least one outlet opening provided on said first side of the hood on a level above a respective inlet opening for allowing fluid recirculation from the inner space of the hood directly to the fluid containment space exterior of the hood, wherein an upper interior surface of the hood is arranged to direct fluid laterally through the at least one outlet to the fluid containment space and in an essentially horizontal direction or in a direction towards the bottom surface of the fluid containment space,
a drain operative to withdraw fluids and fluidized solids from the inner space of the hood, and
flushing means arranged outside the hood for directing flushing fluid from the fluid containment space exterior of the hood towards said at least one inlet opening.

2. The device according to claim 1, wherein upper interior surface of the hood is arranged to direct fluids through the respective outlet opening on said first side of the hood from the inner space of the hood to the fluid containment space exterior of the hood in a direction essentially opposite the flushing direction of the flushing means arranged on the first side of the hood.

3. The device according to claim 1, wherein the hood further comprises at least one inlet opening provided on a second side of the hood opposite the first side thereof for allowing fluid communication from the fluid containment space exterior of the hood to the inner space of the hood, and at least one outlet opening provided on said second side of the hood on a level above a respective inlet opening for allowing fluid recirculation from the inner space of the hood directly to the fluid containment space exterior of the hood, wherein an upper interior surface of the hood is arranged to direct fluid laterally through the at least one fluid outlet provided on the second side of the hood to the fluid containment space and further in an essentially horizontal direction or in a direction towards the bottom surface of the fluid containment space, the device further comprising:
flushing means arranged outside the hood for directing flushing fluid from the fluid containment space exterior of the hood towards said at least one inlet opening on the second side of the hood.

4. The device according to claim 3, wherein the interior surface of the hood is arranged to direct fluids through the respective outlet opening on said second side of the hood from the inner space of the hood to the fluid containment space exterior of the hood in a direction essentially opposite the flushing direction of the flushing means arranged on the second side of the hood.

5. The device according to claim 1, wherein the hood is elongated having an inverted V-shape as seen in cross-section.

6. The device according to claim 1, wherein the respective outlet opening is provided between a side wall of the hood and a top part of the hood.

7. The device according to claim 1, wherein the circulation of fluids between the inner space of the hood and the fluid containment space exterior of the hood affects essentially only fluids in a lower part of the fluid containment space and essentially does not affect fluid in an upper part of the fluid containment space.

8. A separator, comprising:
a separator vessel for separating liquids; and
a device for removing solids from a fluid containment space within the separator vessel, the device comprising a hood arranged at a bottom surface of the fluid containment space, the hood comprising at least one inlet opening provided on a first side of the hood for allowing fluid communication from the fluid containment space exterior of the hood to an inner space of the hood, the hood further comprising at least one outlet opening provided on said first side of the hood on a level above a respective inlet opening for allowing fluid recirculation from the inner space of the hood directly to the fluid containment space exterior of the hood, wherein an upper interior surface of the hood is arranged to direct fluid laterally through the at least one outlet to the fluid containment space and in an essentially horizontal direction or in a direction towards the bottom surface of the fluid containment space, a drain operative to withdraw fluids and fluidized solids from the inner space of the hood, and flushing means arranged outside the hood for directing flushing fluid from the fluid containment space exterior of the hood towards said at least one inlet opening.

9. A method for removing solids from a fluid containment space within a separator vessel for separating liquids, the method comprising:
directing flushing fluid with flushing means arranged outside of a hood, wherein the hood is arranged at a bottom surface of the fluid containment space, and where the flushing means is arranged in the fluid containment space towards at least one inlet opening in a first side of the hood arranged at a bottom surface of the fluid containment space so as to force fluids and fluidized solids from the fluid containment space exterior of the hood through the at least one inlet opening and into an inner space of the hood,
withdrawing a part of the fluids and fluidized solids entering the inner space of the hood through a drain, and
directing another part of said fluids to flow from the inner space of the hood directly back to the fluid containment space exterior of the hood in an essentially horizontal direction or in a direction towards the bottom surface of the fluid containment space through at least one outlet opening provided on said first side of the hood on a level above the respective inlet opening, for allowing fluid recirculation from the inner space of the hood directly to the fluid containment space exterior of the hood, such that circulation of fluids between the inner space of the hood and the fluid containment space exterior of the hood affects essentially only fluids in a lower part of the fluid containment space and essentially does not affect fluid in an upper part of the fluid containment space.

10. The method according to claim 9, further comprising:
directing fluids through the respective outlet opening on said first side of the hood from the inner space of the hood directly to the fluid containment space exterior of the hood in a direction essentially opposite the flushing direction of the flushing means arranged on the first side of the hood.

11. The method according to claim 9, further comprising:
directing flushing fluid with the flushing means towards at least one inlet opening on a second side of the hood opposite the first side thereof so as to force fluids and fluidized solids from the fluid containment space exterior of the hood into the inner space of the hood, and
making a part of the fluids entering the inner space of the hood to flow from the inner space of the hood directly back to the fluid containment space exterior of the hood in an essentially horizontal direction or in a direction towards the bottom surface of the fluid containment space through at least one outlet opening provided on said second side of the hood on a level above the respective inlet opening.

12. The method according to claim 11, further comprising:
directing fluids through the respective outlet opening on said second side of the hood from the inner space of the hood directly to the fluid containment space exterior of the hood in a direction essentially opposite the flushing direction of the flushing means arranged on the second side of the hood.

13. The method according to claim 9, further comprising:
a heavy flushing mode during which the flushing means directs flushing fluid at a higher rate than when circulation of fluids between the inner space of the hood and the fluid containment space exterior of the hood affects essentially only fluids in a lower part of the fluid containment space and essentially does not affect fluid in an upper part of the fluid containment space.

* * * * *